(12) United States Patent
Nakamura et al.

(10) Patent No.: US 6,557,784 B1
(45) Date of Patent: May 6, 2003

(54) MIXER FOR FORMING A THIN OIL FILM ON A SURFACE OF A DROP OF WATER

(75) Inventors: Takashi Nakamura, Nagoya (JP); Kosaburo Niwa, Nagoya (JP); Hiroshi Yoshimura, Nagoya (JP)

(73) Assignee: Daido Metal Company Ltd., Nagoya (JP)

( * ) Notice: Subject to any disclaimer, the term of this patent is extended or adjusted under 35 U.S.C. 154(b) by 220 days.

(21) Appl. No.: 09/705,734

(22) Filed: Nov. 6, 2000

(30) Foreign Application Priority Data

Nov. 24, 1999 (JP) .......................................... 11-332358

(51) Int. Cl.[7] .............................................. B05B 7/06
(52) U.S. Cl. ...................................... 239/427; 239/428
(58) Field of Search .............................. 239/427, 427.3, 239/427.5, 428, 433, 434; 83/169; 118/300

(56) References Cited

U.S. PATENT DOCUMENTS

| | | | | |
|---|---|---|---|---|
| 3,478,843 A | * | 11/1969 | Eckhardt | .................. 184/55.1 |
| 4,505,431 A | * | 3/1985 | Huffman | .................. 239/427.5 |
| 4,967,963 A | | 11/1990 | Brown | |
| 5,050,532 A | * | 9/1991 | Ruppert | .................. 118/300 |
| 5,484,107 A | * | 1/1996 | Holmes | .................. 239/427.5 |
| 5,615,836 A | * | 4/1997 | Graef | ..................... 239/428.5 |

FOREIGN PATENT DOCUMENTS

| | | |
|---|---|---|
| DE | 1 928 573 | 12/1969 |
| DE | 43 38 585 A1 | 5/1995 |
| JP | 06-320384 | 11/1994 |

* cited by examiner

Primary Examiner—Lisa A. Douglas
(74) Attorney, Agent, or Firm—Browdy and Neimark, P.L.L.C.

(57) ABSTRACT

The invention provides a mixer for forming a thin oil film on a surface of a drop of water which can effectively form a drop of water with an oil film. A mixer for forming a thin oil film on a surface of a drop of water is constituted by an oil mist forming chamber for forming an oil supplied from an outer portion in a mist shape by an air stream, a drop of water forming chamber for forming a water supplied from the outer portion by the air stream containing the oil formed in a mist shape in the oil mist forming chamber in a drop of water shape so as to form a drop of water with an oil structured such that a thin oil film is formed on a surface of the drop of water, and a top nozzle for discharging the drop of water with the oil film formed in the drop of water forming chamber to an outer portion. In accordance with the structure mentioned above, it is possible to effectively form the drop of water with the oil film.

5 Claims, 6 Drawing Sheets

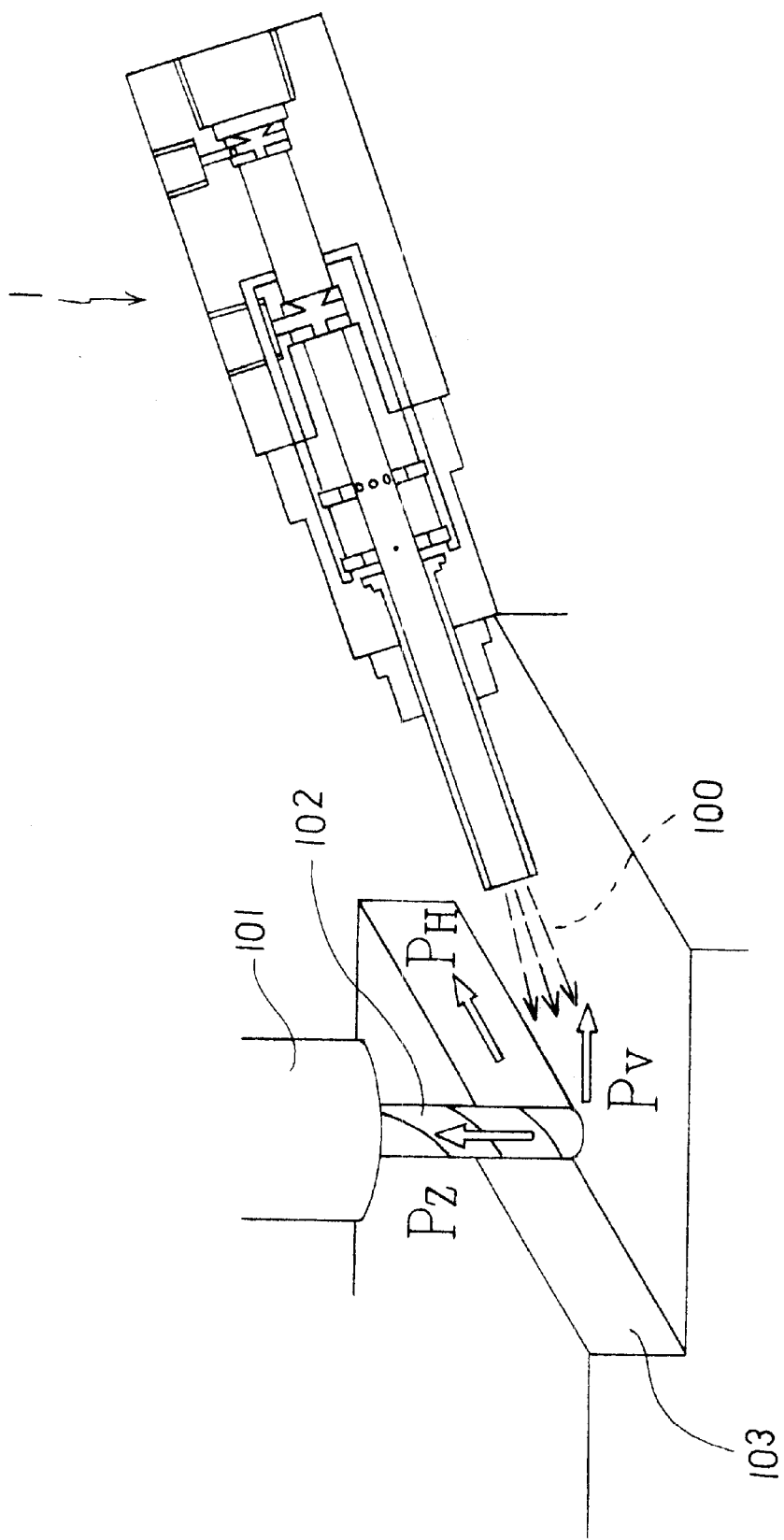

FIG. 5

SUPPLY AMOUNT OF WORKING FLUID AND CONDITION FOR EXPERIMENT

| OIL SOLUTION (RAPESEED OIL) | 10mL / h | DIRECTION OF WORK | UP, DOWN |
|---|---|---|---|
| WATER (SERVICE WATER) | 100mL / h | METHOD OF WORK | PICK FEED WORK |
| AIR | 100NL / min | CUT IN RADIAL DIRECTION | 6mm |
| MATERIAL TO BE CUT | A6063S | CUT IN AXIAL DIRECTION | 9mm |
| TOOL | TWO-FLUTES END MILL | ROTATIONAL AXIS OF MAIN SHAFT | 3000 ~ 6000rpm |
| MATERIAL OF TOOL | TUNGSTEN CARBITE | CUTTING SPEED | 113 ~ 226m / min |
| DIAMETER OF TOOL | $\phi$ 12 | FEEDING SPEED | 0.052 ~ 0.106 mm / rev |

FIG. 6
RESULTS OF MEASURING WORK WITH RESPECT TO VARIOUS KIND OF CUTTING AGENTS
(1)
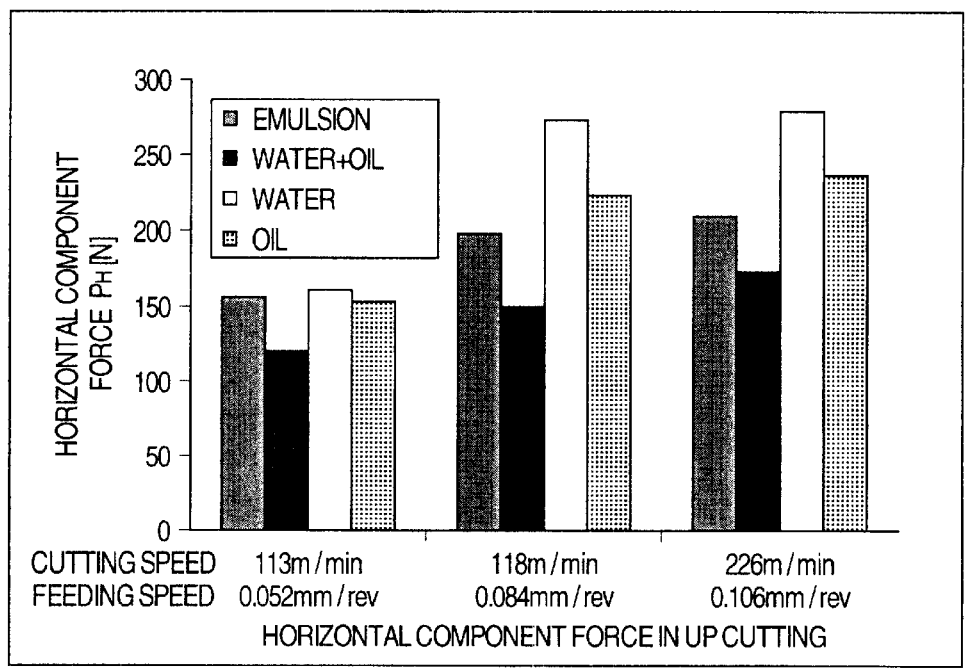
(2)
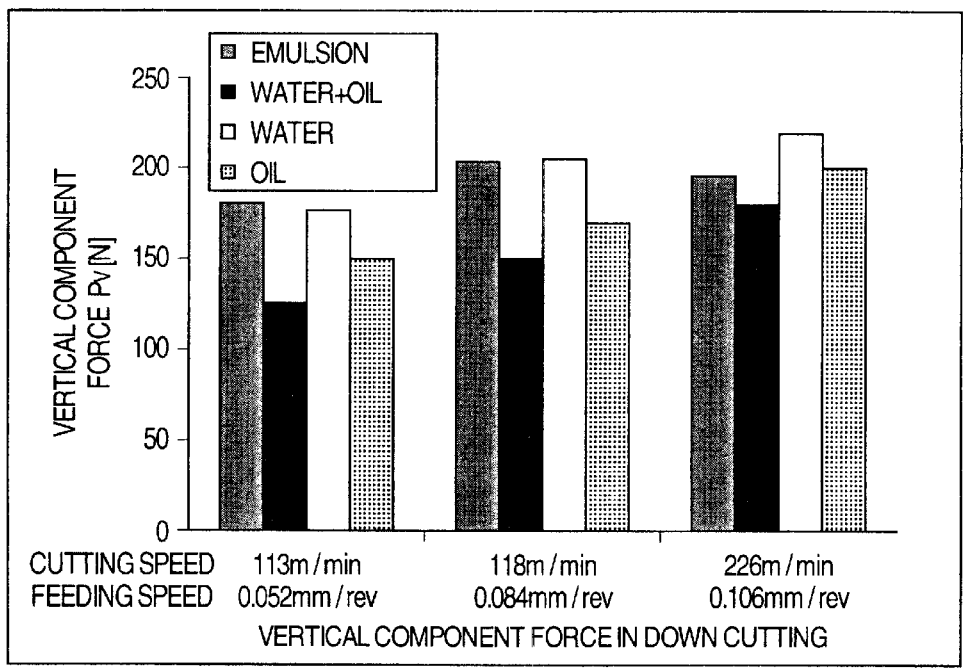

MIXER FOR FORMING A THIN OIL FILM ON A SURFACE OF A DROP OF WATER

BACKGROUND OF THE INVENTION

1. Field of the Invention

The present invention rel

FIG. 4 is a schematic view in a state of supplying the drop of water with the oil film to a working surface by the mixer for forming the thin oil film on the surface of the drop of water;

FIG. 5 is a list showing experimental conditions for a cutting experiment performed by supplying a working fluid by the mixer for forming the thin oil film on the surface of the drop of water; and FIG. 6 is a graph showing experimental results of the cutting experiment performed by supplying the working fluid by the mixer for forming the thin oil film on the surface of the drop of water.

DESCRIPTION OF THE PREFERRED EMBODIMENT

Figure 1:
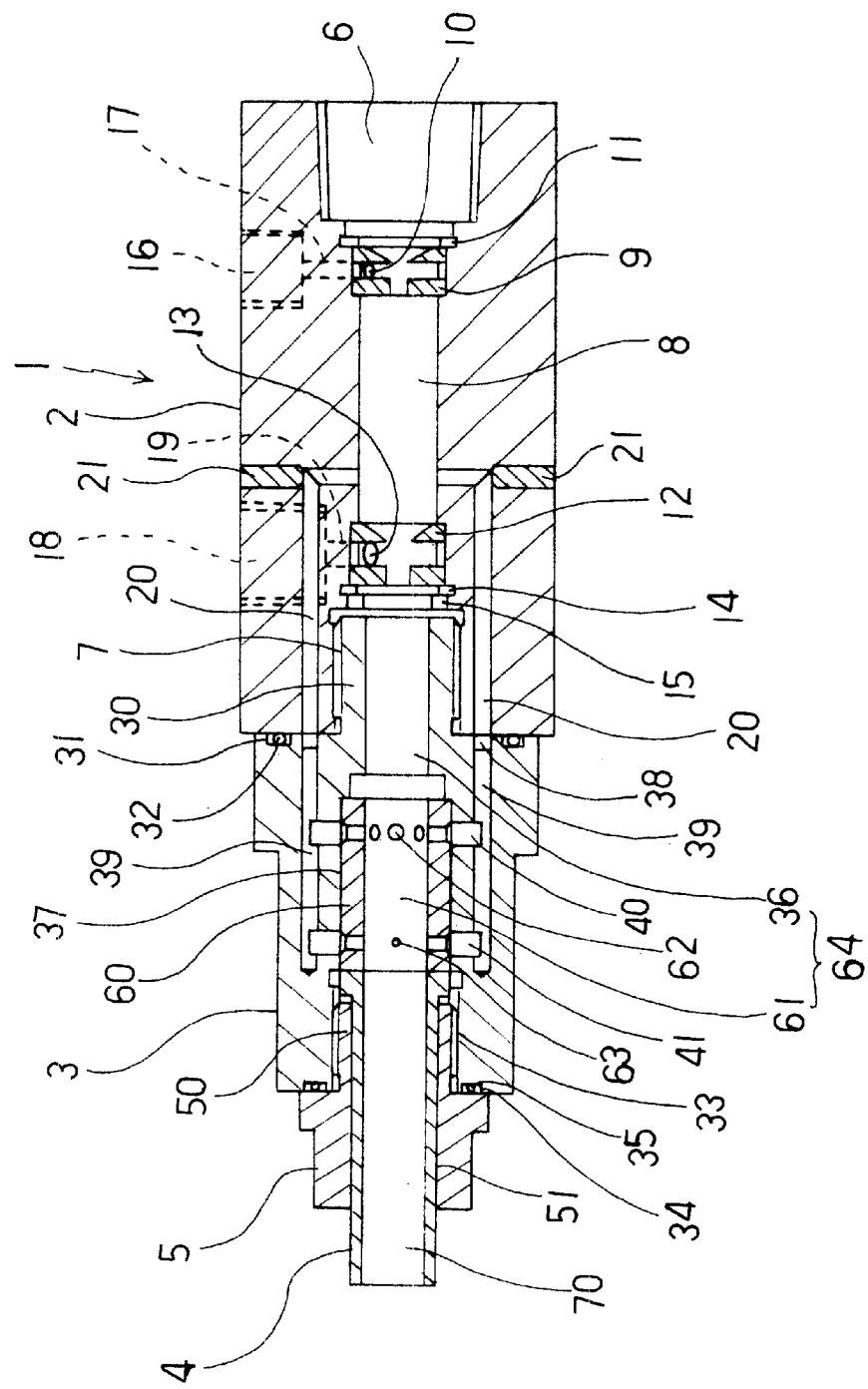

A description will be given below of an embodiment in accordance with the present invention with reference to the accompanying drawings. At first, a description will be given of a structure of a mixer for forming a thin oil film on a surface of a drop of water 1 in accordance with the embodiment with reference to FIG. 1. FIG. 1 is a cross sectional view showing an inner portion of the mixer for forming the thin oil film on the surface of the drop of water 1 in accordance with the present embodiment.

In FIG. 1, the mixer 1 for forming the thin oil film on the surface of the drop of water is constituted by a fog chamber forming member 2 in which an oil mist forming chamber 8 for forming an oil supplied from an outer portion in a mist shape by an air stream is formed, a secondary fog chamber forming member 3 which is connected to the fog chamber forming member 2 and in which drop of water forming chambers 36 and 61 for forming a water supplied from the outer portion in a drop of water shape by an air stream containing the oil formed in a mist shape in the oil mist forming chamber 8 so as to form a drop of water with an oil film are formed, a top nozzle 4 connected to the secondary fog chamber forming member 3 and discharging the formed drop of water with the oil to the outer portion, and a nozzle case 5 for fixing the top nozzle 4 to the secondary fog chamber forming member 3.

At first, a description will be given of a structure of the fog chamber forming member 2 with reference to FIG. 1. The fog chamber forming member 2 is formed in a rectangular column shape or a circular column shape and made of a stainless steel or plastics. A recess-shaped air intake port 6 to which an air duct 82 (refer to FIG. 2) for supplying a compressed air is connected is formed in a center portion of a rear end surface (a right side in the drawing) of the fog chamber forming member 2. On the contrary, a mounting recess portion 7 for inserting the secondary fog chamber forming member 3 so as to mount is formed in a center portion of a front end surface (a left side in the drawing) of the fog chamber forming member 2. The oil mist forming chamber 8 extends from a bottom surface of the air intake port 6 to a bottom surface of the mounting recess portion 7 in such a manner as to extend through the fog chamber forming member 2. In this case, a screw groove for screwing the air duct 82 is formed on an inner peripheral surface of the air intake port 6, and a screw groove for screwing the secondary fog chamber forming member 3 is formed on an inner peripheral surface of the mounting recess portion 7.

Spray nozzles 9 and 12 are fitted and fixed to both end portions of the oil mist forming chamber 8. That is, the oil spray nozzle 9 for forming an oil supplied from an outer portion in a mist shape is fitted to a side of the air intake port 6 and is fixed by a C-type stop ring 11. A water spray nozzle 12 for forming a water supplied from the outer portion in a drop of water shape is fitted to a side of the mounting recess portion 7 and is fixed by a C-type stop ring 14. In this case, a first oil inflow port 10 for making the oil flow into the oil spray nozzle 9 is faced to the oil spray nozzle 9. Further, a water inflow port 13 for making the water flow into the water spray nozzle 12 is faced to the water spray nozzle 12.

An oil intake port 16 to which an oil supply duct 87 (refer to FIG. 2) for supplying the oil is connected is formed close to the air intake port 6 on one side surface of the fog chamber forming member 2, and anvoil intake passage 17 is formed from a bottom surface of the oil intake port 16 toward the first oil inflow port 10. Further, a water intake port 18 to which a water supply duct 92 (refer to FIG. 2) for supplying the water is connected is formed close to the mounting recess portion 7 on the same side surface as the side surface on which the oil intake port 16 is provided, and a water intake passage 19 is formed from a bottom surface of the water intake port 18 toward the water inflow port 13.

Further, L-shaped first bypass passages 20 extending through the oil mist forming chamber 8 are formed at two symmetrical positions from an end surface in a side of the mounting recess portion 7 of the fog chamber forming member 2. Further, a closing member 21 is inserted toward a side surface of the fog chamber forming member 2 from a bent portion of the first bypass passage 20. This closing member 21 closes about half of an outer side of a hole extending from a side surface of the fog chamber forming member 2 toward the oil mist forming chamber 8, and is required for forming the first bypass passage 20 in an L shape. That is, since it is impossible to form the passage in an L shape, an L-shaped structure is achieved by forming a passage from an end surface of the fog forming member 2, forming a passage perpendicular to the passage from the side surface of the fog chamber forming member 2 toward the oil mist forming chamber 8 so as to form a T-shaped passage, and thereafter closing a part of the passage from a crossing portion between two passages toward the side surface of the fog chamber forming member 2 by the closing member 21 in the manner mentioned above.

Next, a description will be given of a structure of the secondary fog chamber forming member 3 with reference to FIG. 1. The secondary fog chamber forming member 3 is formed in a cylindrical shape and made of a stainless steel or plastics. A mounting convex portion 30 inserted to the mounting recess portion 7 of the fog chamber forming member 2 is formed in a-center portion of a rear end surface (a right side in the drawing) of the secondary fog chamber forming member 3. Further, an O-ring mounting groove 31 for fitting and inserting an O-ring 32 is provided in a periphery close to an outer edge portion of the rear end surface so as to form a circular shape, and a bypass passage connecting groove 38 connected to the first bypass passage 20 is provided in a periphery between the O-ring mounting groove 31 and the mounting convex portion 30 so as to form a circular shape. The bypass passage connecting groove 38 is structured such that a diameter in a center of the groove thereof is set to be substantially the same as a distance between centers of two first bypass passages and a groove width thereof is formed in substantially the same as a diameter of the first bypass passage 20. In this case, a screw engaged with a screw groove formed on an inner periphery of the mounting recess portion 7 is formed on an outer periphery of the mounting convex portion 30.

On the contrary, a nozzle case inserting recess portion 33 in which a screw groove is formed on an inner periphery thereof for mounting the nozzle case 5 is formed in a center portion of a front end surface (a left side in the drawing) of the secondary fog chamber forming member 3. Further, an O-ring mounting groove 34 for fitting and inserting an O-ring 35 is provided in a periphery close to an outer edge portion of the front end surface so as to form a circular shape. Further, a drop of water forming chamber 64 for forming the water supplied from the outer portion in a drop of water shape is formed by being extended from a bottom surface of the fog chamber mounting recess portion 7 toward an end surface of the mounting convex portion 30. The drop of water forming chamber 64 is constituted by a first drop of water forming chamber 36 in an upstream side and a second drop of water forming chamber 61 in a downstream side, and the second drop of water forming chamber 61 in the downstream side is constituted by a secondary oil nozzle 60 fitted and inserted to a secondary oil nozzle mounting portion 37 formed close to the nozzle case inserting recess portion 33.

Further, second bypass passages 39 are formed from a bottom surface of the bypass passage connecting groove 38 toward the front end surface of the secondary fog chamber forming member 3 until a position of the secondary oil nozzle mounting portion 37. The second bypass passages 39 are provided at two portions so as to be positioned in a direction of 180 degrees with each other. Further, a first oil inflow groove 40 and a second oil inflow groove 41 are formed in left and right portions in the drawing of the second bypass passage 39 so that the second bypass passage 39 and the secondary oil nozzle mounting portion 37 are communicated with each other.

In this case, the secondary oil nozzle 60 is fitted and inserted to the secondary oil nozzle mounting portion 37 as mentioned above, however, the secondary oil nozzle 60 is formed in a cylindrical shape and made of a stainless steel or a copper alloy, and the second drop of water forming chamber 61 is formed in a center thereof so as to have the same diameter as the diameter of the first drop of water forming chamber 36. Further, a second oil inflow port 62 corresponding to an upstream oil inflow port is formed close to a rear end surface (a right side in the drawing) of the secondary oil nozzle 60 so as to extend from an outer surface of the secondary oil nozzle 60 to the second drop of water forming chamber 61. The second oil inflow port 62 is radially formed at a plurality of portions (four to twelve portions) at a uniform interval. Further, a third oil inflow port 63 corresponding to a downstream oil inflow port is formed close to a front end surface (a left side in the drawing) of the secondary oil nozzle 60 so as to extend from the outer surface of the secondary oil nozzle 60 to the second drop of water forming chamber 61 in the same manner as that of the second oil inflow port 62.

The third oil inflow ports 63 are radially formed at a plurality of portions (at about a half of the number of the second oil inflow ports 62, that is, two to six portions) at a uniform interval. Here, in the case of the present embodiment, a diameter of the second oil inflow port 62 is set to be twice or more the diameter of the third oil inflow port 63.

When inserting the secondary oil nozzle 60 structured in the manner mentioned above to the secondary oil nozzle mounting portion 37, the second oil inflow port 62 and the first oil inflow groove 40 coincide with each other, and the third oil inflow port 63 and the second oil inflow groove 41 coincide with each other.

Next, a description will be given of a structure of the top nozzle 4 with reference to FIG. 1.

The top nozzle 4 is formed in a cylindrical shape and made of a stainless steel or plastics, and a drop of water with an oil film discharging port 70 for discharging the drop of water with the oil film is formed in a center thereof so as to have substantially the same diameter as the diameter of the second drop of water forming chamber 61. Further, a flange is formed on a rear end surface (a right side in the drawing) of the top nozzle 4, and a diameter of the flange is set to be substantially the same as an outer diameter of the secondary oil nozzle 60. The top nozzle 4 mentioned above is mounted to the secondary fog chamber forming member 3 by the nozzle case 5, however, the nozzle case 5 is formed in a cylindrical shape and made of a stainless steel or a copper alloy. Further, a mounting convex portion 50 in which a screw portion engaged with the nozzle case inserting recess portion 33 of the secondary fog chamber forming member 3 is formed on an outer periphery thereof is formed in a center portion of a rear end surface (a right side in the drawing). Further, a top nozzle inserting hole 51 to which the top nozzle 4 is inserted is formed in a center of the nozzle case 5.

A description will be given of an assembly of the mixer for forming the thin oil on the surface of the drop of water 1 constituted of a plurality of parts as mentioned above. At first, the secondary fog chamber forming member 3 is fixed to the fog chamber forming member 2 by attaching the O-ring 32 to the O-ring mounting groove 31 provided on the rear end surface of the secondary fog chamber forming member 3 and thereafter engaging the mounting convex portion 30 of the secondary fog chamber forming member 3 with the mounting recess portion 7 of the fog chamber forming member 2. In this case, since the O-ring mounting groove 31 is structured such that a groove depth is smaller than the diameter of the O-ring 32, an upper end portion of the O-ring 32 protrudes from the rear end surface of the secondary fog chamber forming member 3 at a time of attaching the O-ring 32 to the O-ring mounting groove 31. Accordingly, at a time of fixing the secondary fog chamber forming member 3 to the fog chamber forming member 2, the O-ring 32 is gripped between the bottom surface of the O-ring mounting groove 31 and the front end surface of the fog chamber forming member 2, whereby an airtight state between the fog chamber forming member 2 and the secondary fog chamber forming member 3 can be maintained. Further, since the O-ring 15 is interposed between the C-type stop ring 14 and the end surface of the mounting convex portion 30, the oil mist forming chamber 8 and the first drop of water forming chamber 36 are communicated with each other in a state of keeping an airtight.

Further, since the bypass passage connecting groove 38 on the rear end surface of the secondary fog chamber forming member 3 is provided in the periphery so as to form a circular shape, the first bypass passage 20 is always communicated with the bypass passage connecting groove 38 at a time of fixing the secondary fog chamber forming member 3 to the fog chamber forming member 2. Accordingly, the first bypass passage 20 is communicated with the second bypass passage 39 via the bypass passage connecting groove 38.

Next, the secondary oil nozzle 60 is inserted to the secondary oil nozzle mounting portion 37 of the secondary fog chamber forming member 3 from the side of the nozzle case inserting recess portion 33. At this time, the insertion is performed so that the third oil inflow port 63 of the secondary oil nozzle 60 is first inserted. Then, at a time of inserting the secondary oil nozzle 60 to the secondary oil nozzle mounting portion 37, the second oil inflow port 62 is positioned at the position corresponding to the first oil inflow groove 40 and the third oil inflow port 63 is positioned at a position corresponding to the second oil inflow groove 41, as mentioned above. Accordingly, the second bypass passage 39 is communicated with the second drop of water forming chamber 61 via the first oil inflow groove 40, the second oil inflow port 62, the second oil inflow groove 41 and the third oil inflow port 63.

Next, after attaching the O-ring 35 to the O-ring mounting groove 34 provided on the front end surface of the secondary fog chamber forming member 3, the top nozzle 4 is inserted to the nozzle case inserting recess portion 33 of the secondary fog chamber forming member 3 from the side of the flange portion. Then, the top nozzle 4 and the nozzle case 5 are fixed to the secondary fog chamber forming member 3 by inserting the nozzle case 5 to the top nozzle 4 and engaging the mounting convex portion 50 of the nozzle case 5 with the nozzle case inserting recess portion 33 of the secondary fog chamber forming member 3. In this case, since the O-ring mounting groove 34 is structured such that the groove depth thereof is smaller than the diameter of the O-ring 35, the upper end portion of the O-ring 35 protrudes from the front end surface of the secondary fog chamber forming member 3. Accordingly, at a time of fixing the nozzle case 5 to the secondary fog chamber forming member 3, the O-ring 35 is gripped between the bottom surface of the O-ring mounting groove 34 and the rear end surface of the nozzle case 5, whereby an airtight state between the secondary fog chamber forming member 3 and the nozzle case 5 can be maintained.

Figure 2:
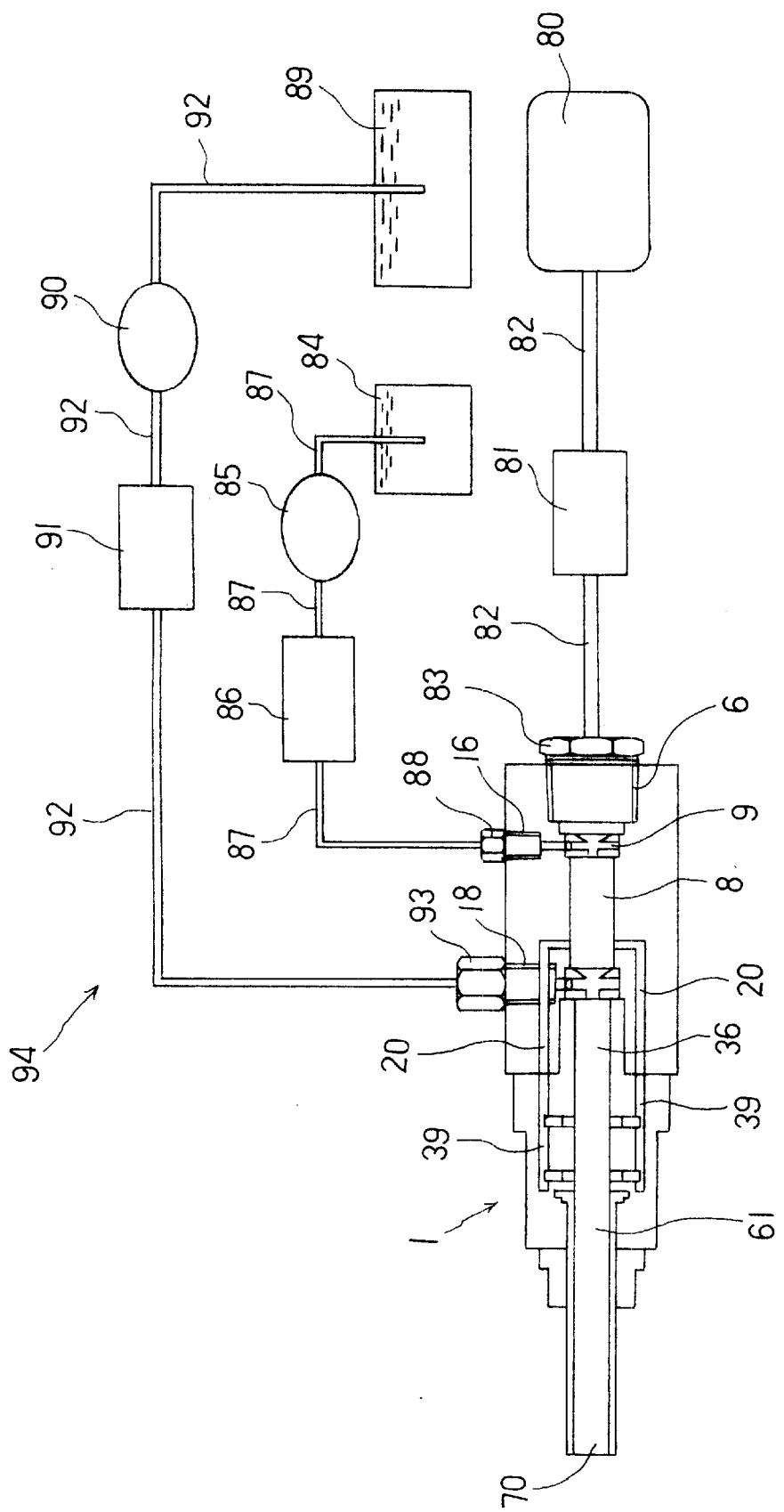
FIG. 2 is a schematic view of an apparatus for supplying the drop of water with the oil film in accordance with an embodiment of the present invention.

The mixer for forming the thin oil film on the surface of the drop of water 1 is assembled in the manner mentioned above. Next, a description will be given of a drop of water with an oil film supplying apparatus 94 for supplying an air, an oil and a water to the mixer for forming the thin oil film on the surface of the drop of water 1 with reference to FIG. 2. FIG. 2 is a schematic view of the drop of water with the oil film supplying apparatus 94 in accordance with an embodiment of the present invention.

In FIG. 2, an air supplying joint 83 for connecting an air supply duct 82 is engaged with the air intake port 6 of the mixer for forming the thin oil film on the surface of the drop of water 1, and the air supply duct 82 connected to the air supplying joint 83 is connected to a flow amount adjust valve 81 for adjusting a flow amount of the air. The air flow adjust valve 81 is connected to a compressor 80 for supplying the air via the air supply duct 82.

Further, an oil supplying joint 88 for connecting an oil supply duct 87 is engaged with the oil intake port 16 of the mixer for forming the thin oil film on the surface of the drop of water 1, and the oil supply duct 87 connected to the oil supplying joint 88 is connected to an oil measuring valve 86 for measuring an amount of the oil. The oil measuring valve 86 is connected to an oil pump 85 for supplying the oil via the oil supply duct 87, and the oil supply duct 87 is connected to an oil tank 84 in which the oil is stored from the oil pump 85.

Further, a water supplying joint 93 for connecting a water supply duct 92 is engaged with the water intake port 18 of the mixer for forming the thin oil film on the surface of the drop of water 1, and the water supply duct 92 connected to the water supplying joint 93 is connected to a water measuring valve 91 for measuring an amount of the water. The water measuring valve 91 is connected to a water pump 90 for supplying the water via the water supply duct 92, and the water supply duct 92 is connected to a water tank 89 in which the water is stored from the water pump 90.

Next, a description will be given of a process in which a drop of water with an oil film 100 is formed within the mixer for forming the thin oil film on the surface of the drop of water 1 due to the water, the oil and the water supplied to the mixer for forming the thin oil film on the surface of the drop of water 1 with reference to FIGS. 1 and 2.

At first, a compressed air supplied from the compressor 80 is fed into the oil spray nozzle 9 from the air intake port 6. Further, the oil supplied from the oil tank 84 passes through the oil intake passage 17 from the oil intake port 16 and flows into the oil spray nozzle 9 from the first oil inflow port 10. The oil flowed into the oil spray nozzle 9 is formed in a mist shape due to a pressure of the air compressed within the oil spray nozzle 9 so as to be injected out into the oil mist forming chamber 8, and thereafter is fed into the water spray nozzle 12 together with the compressed air. At this time, a part of the oil which is not formed in a mist shape flows into the first bypass passage 20 along an inner peripheral surface of the oil mist forming chamber 8 with keeping a liquid state, and thereafter flows into the first oil inflow groove 40 and the second oil inflow groove 41 via the bypass passage connecting groove 38 and the second bypass passage 39.

The oil flowing into the first oil inflow groove 40 is injected out into the second drop of water forming chamber 61 from the second oil inflow port 62 provided in the secondary oil nozzle mounting portion 37. Further, the oil flowing into the second oil inflow groove 41 is injected out into the second drop of water forming chamber 61 from the third oil inflow port 63 provided in the secondary oil nozzle mounting portion 37.

At this time, since the diameter of the second oil inflow port 62 is twice the diameter of the third oil inflow port 63 and the second oil inflow ports 62 are provided at a plurality of portions (eight portions in the case of the illustrated embodiment), but the third oil inflow ports 63 are provided at a half number thereof, a pressure higher than a pressure applied to the second oil inflow port 62 is applied to the third oil inflow port 63, and the oil is hard to flow into the third oil inflow port 63 in comparison with the second oil inflow port 62. That is, the structure is made such that an amount of the oil inflow is more in the second oil inflow port 62 than the third oil inflow port 63. Accordingly, the oil within the second bypass passage 39 is at first injected out into the second drop of water forming chamber 61 from the second oil inflow port 62 and next is injected out into the second drop of water forming chamber 61 from the third oil inflow port 63.

On the contrary, the water supplied from the water tank 89 passes through the water intake passage 19 from the water intake port 18 and flows into the water spray nozzle 12 from the first water inflow port 13. The water flowing into the water spray nozzle 12 is formed in a drop of water by the compressed air fed into the water spray nozzle 12 from the oil mist forming chamber 8 and the oil formed in a mist shape is attached to a whole of the surface of the drop of water as an oil film, whereby the drop of water with the oil film is formed in the first drop of water forming chamber 36. At this time, the oil film is not attached to all of the drop of water, and there exists the drop of water to which the oil film is not attached.

The oil flowing from the second oil inflow port 62 is attached to the whole of the surface of the drop of water to which the oil film is not attached, at a time when the drop of water is injected to the second drop of water forming chamber 61 from the first drop of water forming chamber 36, thereby forming the drop of water with the oil film. At this time, most of the drop of water becomes the drop of water with the oil film by the oil film being attached thereto, however, even in the case that a little amount of drop of water to which the oil film is not attached is left at this time, the oil flowing from the third oil inflow port 63 is attached to the drop of water so as to form the oil film, thereby forming the drop of water with the oil film, so that the drop of water formed in the water spray nozzle 12 becomes the drop of water with the oil film at a rate of 100% All the drop of water with the oil film formed in this manner passes through the drop of water with the oil film discharging port 70 and is discharged out of the mixer for forming the thin oil film on the surface of the drop of water 1. In this case, a size of the drop of water with the oil film formed in the mixer for forming the thin oil film on the surface of the drop of water 1 in accordance with the present embodiment is between 100 μm and 200 μm.

Figure 3:
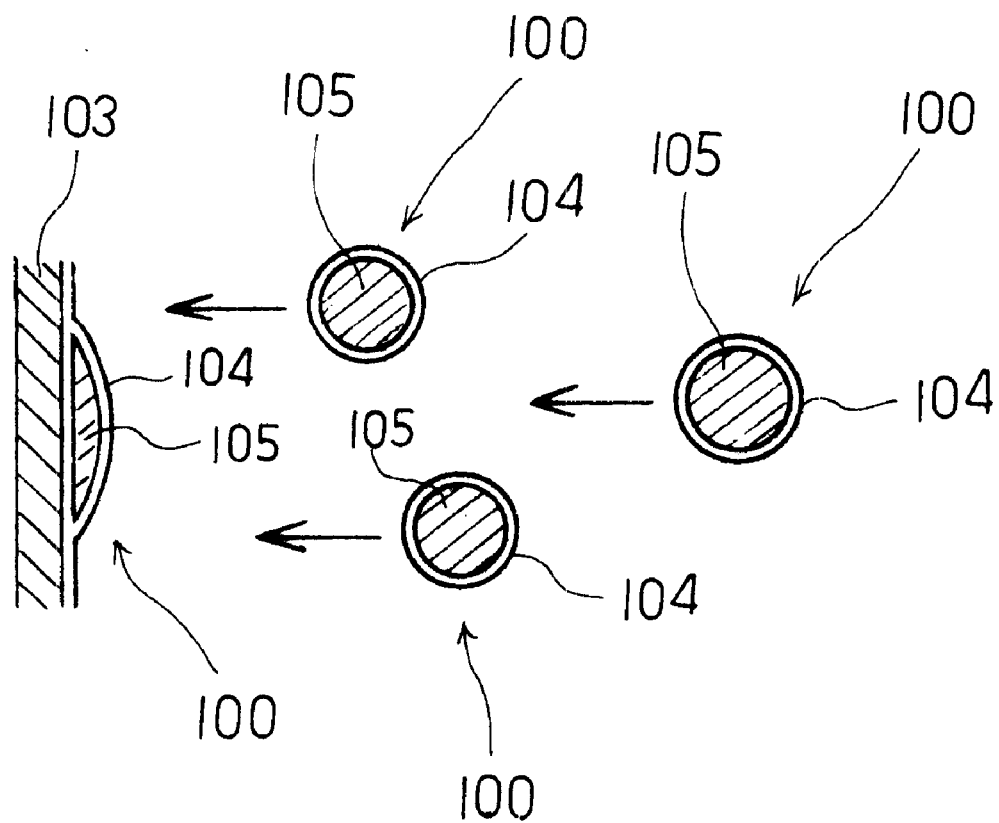
FIG. 3 is a schematic view of the drop of water with the oil film and a surface of a structure to be worked to which the drop of water with the oil film is attached.

In accordance with the present embodiment, a working process is performed while supplying the drop of water with the oil film formed in the mixer for forming the thin oil film on the surface of the drop of water 1 to the surface to be worked of the structure, however, in the case of supplying the drop of water with the oil film to the surface to be worked of the structure, an oil film 104 is formed on a surface of a structure 103 as shown in FIG. 3, and the drop of water with the oil film 100 is attached onto the oil film 104. In this case, FIG. 3 is a schematic view of the drop of water with the oil film 100 and the surface of the structure 103 to which the drop of water with the oil film 100 is attached.

Next, a description will be given of a working experiment performed by supplying the drop of water with the oil film 100 by the mixer for forming the thin oil film on the surface of the drop of water 1 with reference to FIGS. 4, 5 and 6. FIG. 4 is a schematic view in a state of supplying the drop of water with the oil film 100 to the working surface by the mixer for forming the thin oil film on the surface of the drop of water 1, FIG. 5 is a list showing experimental conditions for a cutting experiment performed by supplying the working fluid by the mixer for forming the thin oil film on the surface of the drop of water 1 and FIG. 6 is a graph showing experimental results, of the cutting experiment performed by supplying the working fluid by the mixer for forming the thin oil film on the surface of the drop of water 1.

At first, in the process of the experiment, an end mill cutting work is performed by a vertical-type machining center while supplying the drop of water with the oil film 100 to the surface to be worked of the structure 103 from the mixer for forming the thin oil film on the surface of the drop of water 1 and a working stress is measured. The cutting work is performed by a pick feed corner work by an end mill 102, and the measurement of the working stress is performed by measuring a horizontal component force PH in a feeding direction of the tool (the end mill 102), a vertical component force $P_V$ in a pick feed direction and an axial component force $P_z$ in an axial direction of the tool by means of KISTER Piezo3-component dynamometer 9257B-5019A.

Further, as the conditions of the experiment, as shown in FIG. 5, the working fluid employs a rapeseed oil which has a property of biodegradation and a reduced environmental load and easily forms a film on a water surface (has a large expanding ability) as an oil solution, and employs a service water as the water. With respect to a supply amount of the working fluid, 10 mL/h of the oil solution and 100 mL/h of the water, both being significantly small amount, are employed, and with respect to a supply amount of the air, 100 NL/min, being comparatively small amount, is employed. Further, A6063S duralumin is employed for the material to be cut, and a two-flutes end mill 102 made of a cemented solid(e.g. tungsten carbide) and having a diameter of φ12 is employed for the tool.

Further, as the working conditions, a working direction is an up cutting and a down cutting. The up cutting corresponds to a case that a cutting direction of the tool in a side of the structure contact surface and a feeding direction of the tool are the same, that is, a case of cutting so that a blade of the tool scoops up the structure, and the down cutting corresponds to a case that the cutting direction of the tool in the side of the structure contact surface and the feeding direction of the tool are opposed to each other, that is, a case of cutting so that the blade of the tool is put over the structure. The working method is, as mentioned above, the pick feed work, a cutting size in a radial direction with respect to the structure is 6 mm and a cutting size in an axial direction is 9 mm. Further, a rotational number of a main shaft of the machining center is between 3000 and 6000 rpm, a cutting speed is between 113 and 226 m/min and a feeding speed is between 0.052 and 0.106 mm/rev. In this case, the pick feed work corresponds to a working method of subsequently applying a cutting operation in perpendicular to the feeding direction of the tool in an intermittent manner.

Further, in the present experiment, a performance of the working fluid is compared by performing the working experiment in three cases of supplying the working fluid, that is, a case of supplying only the water with stopping the oil supply, a case of supplying only the oil with stopping the water supply and a case of flood supplying an emulsion on sale (KT-100:5%).

Next, a description will be given of results of the working experiment performed under the conditions mentioned above. In this working experiment, the results of measuring the working stress at a time of changing the cutting speed (a peripheral speed) from 113 m/min to 226 m/min and the feeding speed from 0.052 mm/rev to 0.106 mm/rev are shown in (1) and (2) of FIG. 6. FIG. 6(1) corresponds to a case that the cutting direction is set to the up cutting, in which the result of measuring the horizontal component force $P_H$ is compared with respect to the kind of the working fluid. Values of the vertical component force $P_V$ and the axial component force $P_Z$ are smaller than the horizontal component force $P_H$ and the change amount due to the difference of the working fluid is less, so that in this case, the result of measuring the horizontal component fore $P_H$, is compared. The value of the horizontal component force $P_H$ is the smallest in the case that the working fluid is the drop of water with the oil film 100, becomes greater in the order of the case of the emulsion and the case of only the oil, and becomes the greatest in the case of only the water.

The same result is obtained without reference to the cutting speed and the feeding speed. The horizontal component force $P_H$ in the case of employing only the oil is greater than the horizontal component force $P_H$ in the case of employing the drop of water with the oil film 100 because the supply amount is significantly small. Further, in the case of only the oil, the oil formed in a mist shape becomes fine (having a diameter of about 10 to 30 μm) and a rate of being attached onto the surface to be worked of the structure is a little, however, in the case of the drop of water with the oil film 100, the drop of water is not excessively scattered in the atmospheric air even at a significantly small supply amount since the diameter thereof is between 100 and 200 μm, so that it is considered that the drop of water is sufficiently attached to the surface to be worked of the structure.

Next, FIG. 6(2) corresponds to a case that the cutting direction is set to the down cutting, in which the result of measuring the vertical component force $P_V$ is compared with respect to the kind of the working fluid. In this case, the vertical component force $P_V$, in the case of employing only the oil is smaller than the vertical component force $P_V$ in the case of employing only the water and the emulsion, and the vertical component force $P_V$ in the case of employing the drop of water with the oil film 100 is the smallest in the same manner as that of the up cutting. In this case, in the case of employing the drop of water with the oil film 100 for the working fluid, there is no great change in the vertical component force PV even in the case of making the supply amount of the oil greater than 10 mL/h.

As mentioned above, at a time of cutting the structure by the end mill, in the case of performing the cutting work while supplying the drop of water with the oil film 100 onto the surface to be worked of the structure, it is confirmed that the working stress shows a low value in comparison with the case of employing only the water, only the oil or the emulsion for the working fluid, in both of the up cutting case and the down cutting case.

Further, in the cutting experiment employing a soft steel for the material to be cut, a lamp black is generated from a working point in the case of employing only the oil for the working fluid, however, no lamp black is generated in the case of employing the drop of water with the oil film 100 for the working fluid. This is because the water at a hundred times the supply amount of the oil serves a flame preventing effect and a work heat cooling effect.

As mentioned above, the embodiment is in detail described. In accordance with the present embodiment, in the mixer for forming the thin oil film on the surface of the drop of water 1 for supplying the drop of water with the oil film 100 corresponding to the working fluid used at a time of working the structure 103 and structured such that the oil film 104 is formed on the surface of the drop of water 105, the mixer for forming the thin oil film on the surface of the drop of water 1 comprises the oil mist forming chamber 8 for forming the oil supplied from the outer portion in a mist shape by the air stream, the drop of water forming chamber 64 for forming the water supplied from the outer portion by the air stream containing the oil formed in a mist shape in the oil mist forming chamber 8 in a drop of water shape so as to form the drop of water with the oil 100 structured such that the oil film 104 is formed on the surface of the drop of water 105, and the top nozzle 4 for discharging the drop of water with the oil film 100 formed in the drop of water forming chamber 64 to the outer portion. In accordance with the structure mentioned above, it is possible to effectively form the drop of water with the oil film 100.

Further, in accordance with the present embodiment, the drop of water forming chamber 64 is constituted by the first drop of water forming chamber 36 disposed in the upstream side of the air flow and the second drop of water forming chamber 61 disposed in the downstream side thereof, and the oil inflow ports 62 and 63 for making the oil supplied from the outer portion to flow into is faced to the second drop of water forming chamber 61. In accordance with the structure mentioned above, it is possible to again attach the oil to the drop of water 105 flowing through the drop of water forming chamber 64 and having no oil film formed thereon, and it is possible to improve a rate of forming the drop of water with the oil film 100.

Further, in accordance with the present embodiment, the oil inflow ports 62 and 63 are communicated with the oil mist forming chamber 8 via the bypass passages 20 and 39 so as to supply the oil which is not formed in a mist shape in the oil mist forming chamber 8 to the oil inflow ports 62 and 63 via the bypass passages 20 and 39. In accordance with the structure mentioned above, since the liquid-like oil which is not formed in a mist shape in the oil mist forming chamber 8 is used after being again formed in a mist shape in the oil inflow ports 62 and 63, it is possible to effectively form the drop of water with the oil film 100 at a minimum amount of oil.

Further, in accordance with the present embodiment, the oil inflow ports 62 and 63 are constituted by the upstream oil inflow port 62 disposed in the upstream side of the air flow and the downstream oil inflow port 63 disposed in the downstream side thereof, and the oil inflow amount is more in the upstream oil inflow port 62 than in the downstream oil inflow port 63. In accordance with the structure mentioned above, it is possible to significantly increase a rate of forming the drop of water with the oil film 100.

In this case, since the drop of water with the oil film 100 formed by the mixer for forming the thin oil film on the surface of the drop of water 1 in accordance with the present embodiment is structured such that the oil is formed on the surface of the drop of water 105 having a great mass so as to form the oil film 104, the drop of water is not excessively scattered. Accordingly, since a large amount of oil is attached to the surface to be worked of the structure, and the structure 103 and the working tool are lubricated, as well as it is possible to improve a working accuracy and increase a service life of the work tool, a risk of generating the fire and an influence applied to the human body are reduced, so that no bad influence is applied to the industrial environment. Further, the drop of water 105 attached to the surface to be worked of the structure 103 together with the oil film 104 increases an effect of cooling the heat generated by the working and a flame preventing effect of preventing the fire from being generated.

As is apparent from the description mentioned above, in accordance with a first aspect of the present invention, in a mixer for forming a thin oil film on a surface of a drop of water for supplying a drop of water with a thin oil film corresponding to a working fluid used at a time of working a structure and structured such that an oil film is formed on a surface of a drop of water, the mixer for forming the thin oil film on the surface of the drop of water comprises an oil mist forming chamber for forming an oil supplied from an outer portion in a mist shape by an air stream, a drop of water forming chamber for forming a water supplied from the outer portion by the air stream containing the oil formed in a mist shape in the oil mist forming chamber in a drop of water shape so as to form a drop of water with a thin oil structured such that an oil film is formed on a surface of the drop of water and a top nozzle for discharging the drop of water with the oil film formed in the drop of water forming chamber to an outer portion. In accordance with the structure mentioned above, it is possible to effectively form the drop of water with the oil film.

Further, in accordance with a second aspect of the present invention, the drop of water forming chamber is constituted by a first drop of water forming chamber disposed in an upstream side of the air flow and a second drop of water forming chamber disposed in a downstream side thereof, and an oil inflow port for making the oil supplied from the outer portion flow into is faced to the second drop of water forming chamber. In accordance with the structure mentioned above, it is possible to again attach an oil to the drop of water flowing through the drop of water forming chamber and having no oil film formed thereon, and it is possible to improve a rate of forming the drop of water with the oil film.

Further, in accordance with a third aspect of the present invention, the oil inflow port is communicated with the oil mist forming chamber via a bypass passage so as to supply the oil which is not formed in a mist shape in the oil mist forming chamber to the oil inflow port via the bypass passage. In accordance with the structure mentioned above, since the liquid-like oil which is not formed in a mist shape in the oil mist forming chamber is used after being again formed in a mist shape in the oil inflow port, it is possible to effectively form the drop of water with the oil film at a minimum amount of oil.

Further, in accordance with a fourth aspect of the present invention, the oil inflow port is constituted by an upstream oil inflow port disposed in an upstream side of the air flow and a downstream oil inflow port disposed in a downstream side thereof, and an oil inflow amount is more in the upstream oil inflow port than in the downstream oil inflow port. In accordance with the structure mentioned above, it is possible to significantly increase a rate of forming the drop of water with the oil film.

In this case, since the drop of water with the oil film formed by each of the inventions mentioned above is structured such that the oil is formed on the surface of the drop of water having a great mass so as to form the oil film, the drop of water is not excessively scattered. Accordingly, since a large amount of oil is attached to the surface to be worked of the structure, and the structure and the working tool are lubricated, as well as it is possible to improve a working accuracy and increase a service life of the work tool, a risk of generating the fire and an influence applied to the human body are reduced, so that no bad influence is applied to the industrial environment. Further, the drop of water attached to the surface to be worked of the structure together with the oil film increases an effect of cooling the heat generated by the working and a flame preventing effect of preventing the fire from being generated.

What is claimed is:

1. A mixer for forming a thin oil film on a surface of a drop of water, comprising:

an oil mist forming chamber for forming an oil mist, supplied in an air stream to said chamber in a mist;

a water-drop forming chamber downstream of said oil mist forming chamber for forming a drop of water with a thin oil film formed on a surface of the drop of water; and a top nozzle for discharging the drop of water with the oil film thereon downstream from said water-drop forming chamber.

2. A mixer for forming a thin oil film on a surface of a drop of water as claimed in claim 1, wherein said water-drop forming chamber is constituted by a first water-drop forming chamber disposed in an upstream side of said air stream and a second water-drop forming chamber disposed in a downstream side thereof, and an oil inflow port for feeding the oil is located facing said second water-drop forming chamber.

3. A mixer for forming a thin oil film on a surface of a drop of water as claimed in claim 2, wherein said oil inflow port is communicated with said oil mist forming chamber via a bypass passage so as to supply oil which is not formed into a mist in said oil mist forming chamber to the oil inflow port via the bypass passage.

4. A mixer for forming a thin oil film on a surface of a drop of water as claimed in claim 2, wherein said oil inflow port is constituted by an upstream oil inflow port disposed in an upstream side of the air stream and a downstream oil inflow port disposed in a downstream side thereof, and wherein said upstream oil inflow port is adapted to feed more oil than the downstream oil inflow port.

5. A mixer for forming a thin oil film on a surface of a drop of water as claimed in claim 3, wherein said oil inflow port is constituted by an upstream oil inflow port disposed in a an upstream side of the air stream and a downstream oil inflow port disposed in a downstream side thereof, and wherein said upstream oil inflow port is adapted to feed more oil than the downstream oil inflow port.

* * * * *